(12) United States Patent
Smith et al.

(10) Patent No.: US 11,509,970 B2
(45) Date of Patent: Nov. 22, 2022

(54) SYSTEMS AND METHODS FOR STREAM VIEWING WITH EXPERTS

(71) Applicant: SONY INTERACTIVE ENTERTAINMENT LLC, San Mateo, CA (US)

(72) Inventors: Kimberlee Smith, San Mateo, CA (US); Leslie Espy, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 17/198,056

(22) Filed: Mar. 10, 2021

(65) Prior Publication Data

US 2022/0295153 A1 Sep. 15, 2022

(51) Int. Cl.
| | |
|---|---|
| H04N 7/10 | (2006.01) |
| H04N 21/488 | (2011.01) |
| H04N 21/2187 | (2011.01) |
| G06F 40/169 | (2020.01) |
| H04N 21/475 | (2011.01) |
| G06N 20/00 | (2019.01) |

(52) U.S. Cl.
CPC ....... *H04N 21/4884* (2013.01); *G06F 40/169* (2020.01); *H04N 21/2187* (2013.01); *H04N 21/4753* (2013.01); *H04N 21/4882* (2013.01); *G06N 20/00* (2019.01)

(58) Field of Classification Search
CPC .......... H04N 21/4884; H04N 21/2187; H04N 21/4753; H04N 21/4882; G06F 40/169; G06N 20/00

USPC .......................................................... 725/32
See application file for complete search history.

(56) References Cited

U.S. PATENT DOCUMENTS

| | | | |
|---|---|---|---|
| 8,185,448 B1 | 5/2012 | Myslinski | |
| 8,321,295 B1 | 11/2012 | Myslinksi | |
| 10,810,361 B1* | 10/2020 | Venkatraman | ........ H04L 63/101 |
| 10,923,139 B2* | 2/2021 | Shen | ....................... G10L 25/21 |
| 11,082,457 B1* | 8/2021 | Oliver | ..................... G06F 40/58 |
| 11,128,483 B1* | 9/2021 | Surazski | ............. H04L 12/1831 |
| 11,140,459 B2* | 10/2021 | Ingel | .................. H04N 21/4755 |
| 2007/0250901 A1* | 10/2007 | McIntire | ............ H04N 21/8586 |
| | | | 725/146 |

(Continued)

OTHER PUBLICATIONS

U.S. Appl. No. 17/198,059, Jennifer Sheldon, Systems and Methods for Real Time Fact Checking During Stream Viewing.
U.S. Appl. No. 17/198,059 Office Action dated Jan. 13, 2022.

*Primary Examiner* — Jefferey F Harold
*Assistant Examiner* — Sahar Aqil Riaz
(74) *Attorney, Agent, or Firm* — Polsinelli LLP

(57) ABSTRACT

The present disclosure relates to systems and methods for group-watching video streams. In one aspect, the disclosed systems and methods may provide expert commentary and annotations to enhance the enjoyment and engagement with the streaming media. The expert may be identified to join the group-watching event or pre-existing expert annotations may be displayed to the viewers at the group-watching event. In another aspect, the systems and methods nay generate an overlay for the streaming media that includes expert provided annotations and comments about the streaming media.

22 Claims, 6 Drawing Sheets

(56) References Cited

U.S. PATENT DOCUMENTS

| | | | |
|---|---|---|---|
| 2008/0034041 A1* | 2/2008 | Kang | H04N 21/23805 709/205 |
| 2011/0145068 A1* | 6/2011 | King | G06F 40/169 705/14.55 |
| 2012/0317046 A1 | 12/2012 | Myslinksi | |
| 2013/0151240 A1 | 6/2013 | Myslinksi | |
| 2013/0159858 A1* | 6/2013 | Joffray | H04N 21/4307 715/719 |
| 2014/0047335 A1 | 2/2014 | Lewis et al. | |
| 2014/0157103 A1* | 6/2014 | Lee | G06F 40/169 715/230 |
| 2014/0201631 A1* | 7/2014 | Pornprasitsakul | G11B 27/031 715/716 |
| 2014/0245365 A1* | 8/2014 | Axelrod | H04N 21/8126 725/109 |
| 2015/0279425 A1* | 10/2015 | Goranson | G11B 27/102 386/230 |
| 2015/0326949 A1* | 11/2015 | Burton | G10L 15/26 704/235 |
| 2017/0286383 A1* | 10/2017 | Koul | A61F 9/08 |
| 2018/0160069 A1* | 6/2018 | Burger | H04N 21/4312 |
| 2018/0268253 A1* | 9/2018 | Hoffman | G06F 40/30 |
| 2018/0286429 A1 | 10/2018 | Bostick et al. | |
| 2018/0349362 A1* | 12/2018 | Sharp | G06F 16/14 |
| 2020/0264905 A1* | 8/2020 | Fox | G06F 3/0481 |
| 2020/0321005 A1* | 10/2020 | Iyer | G10L 15/26 |
| 2021/0076106 A1* | 3/2021 | Marten | G09B 7/08 |

* cited by examiner

SYSTEMS AND METHODS FOR STREAM VIEWING WITH EXPERTS

BACKGROUND

1. Field of Disclosure

The present disclosure generally relates to systems and method for streaming viewing media with experts to provide real-time or near-real time annotations on the streaming media. In particular, the disclosed systems and methods allow viewers to selectively incorporate expert commentary and annotations into the media stream.

2. Description of the Related Art

Systems exist to facilitate coordinated group-watching or viewing of online streaming media. While these systems may be used in conjunction with third-party chat platforms, they existing systems often fail to incorporate additional context and information desired by the viewers.

SUMMARY OF THE CLAIMED DISCLOSURE

According to one aspect, the present disclosure relates to a method for creating and displaying annotations to a viewer of streaming media. The method includes storing data regarding the streaming media, identify an expert to provide the annotations; and displaying the streaming media to the viewer. The method also includes receiving annotation data from the expert, displaying the annotation with the streaming media, and storing the annotation data.

The method may further include identifying a previously stored annotation, retrieving the previously stored annotation, and displaying the previously stored annotation. Additionally, the methods may also include generating an annotation overlay comprising the received annotations, synchronizing the annotation overlay with the streaming media, displaying the annotation overlay with the streaming media, and storing the annotation overlay.

In various aspects, the expert is identified using at least one of crowd-sourced data, machine learning and expert credential verification. In another aspect, the annotations are displayed in a peripheral portion of the streaming media. In various aspects, the annotations are displayed in a region of the streaming media corresponding to a subtitle. In other aspects, the annotations are displayed in a background of the streaming media.

According to one aspect, the present disclosure also relates to a system for creating and displaying annotations to a viewer of streaming media. In one aspect, the system includes a database that stores information regarding the streaming media and stores annotations and overlays. The system also includes a content provider server that provides the streaming media and a host server that stores data regarding the streaming media, identifies an expert to provide the annotations, and displays the streaming media to the viewer. The host server also receives annotation data from an expert, displays the annotation with the streaming media, and stores the annotation data.

In one aspect, the host server further identifies a previously stored annotation, retrieves the previously stored annotation, and displays the previously stored annotation. In another aspect, the host server generates an annotation overlay comprising the received annotations, synchronizes the annotation overlay with the streaming media, displays the annotation overlay with the streaming media, and stores the annotation overlay. In various aspects, the expert is identified using at least one of crowd-sourced data, machine learning, and expert credential verification. In another aspect, the annotations may be displayed in a peripheral portion of the streaming media or the annotations may be displayed in a region of the streaming media corresponding to a subtitle. Alternatively, the annotations may be displayed in a background of the streaming media.

According to various aspects, the aforementioned methods may be embodied as a program or instructions in a non-transitory computer readable medium executable by processor in computing network. The embodied program or portions thereof may be executed on multiple computing devices across a network.

DETAILED DESCRIPTION

The present disclosure describes methods and systems for group-watching video streams. In particular, an annotation display populated by expert commentary and other annotations may be generated and made available to the viewers. In various aspects, one or more subject matter expert may be virtually paired with the viewers during the display of the streaming media. As such, the expert may provide commentary in real time and engage with the viewers. In another aspect, the expert may provide prepared comments and annotations that are then displayed during the group-watching event.

Figure 1:
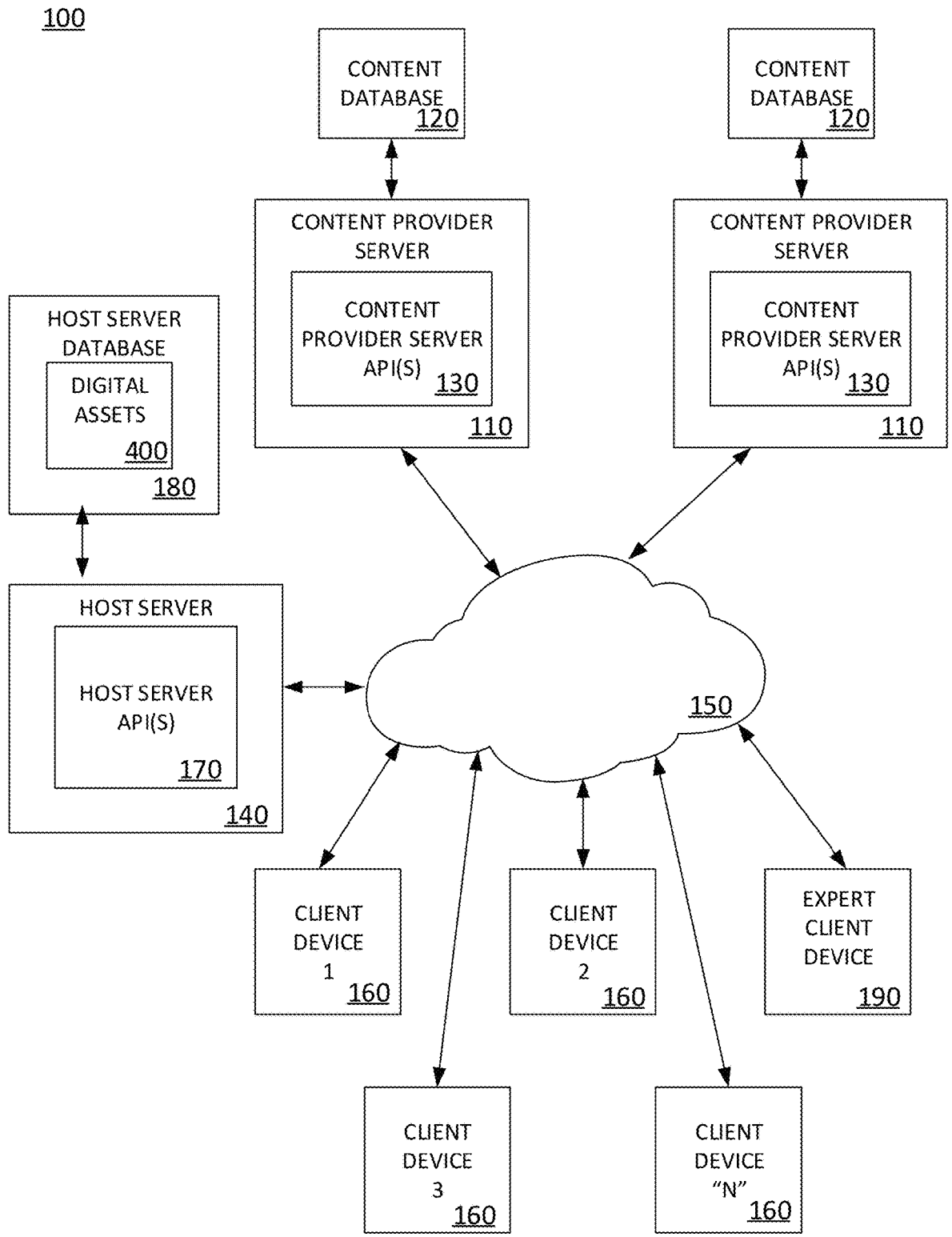
FIG. 1 illustrates an exemplary network environment in which a system for the group-viewing of streaming media with expert commentary or annotation may be implemented.

FIG. 1 illustrates a network environment 100 in which a system for group-viewing of a media stream and incorporating subject-matter expert commentary and annotations into the display of the media stream may be implemented. The network environment 100 may include one or more content provider servers 110 that provide streaming content (e.g., video), stored in one or more database 120, for distribution (e.g., via video on-demand (VOD) services) using one or more content provider server application program interfaces (APIs) 130. The network environment 100 may also include a content delivery host server 140, a public network 150, one or more client devices 160, and one or more expert client device 190.

Content provider servers 110 may maintain and provide media content available for streaming. Such media content may include not only pre-recorded content (e.g., DVR content), but also streams of live broadcasts (e.g., live sporting events, live e-sporting events, broadcast premieres). The content provider servers 110 may be associated with any content provider, such as but not limited to Netflix®, Hulu®, or Amazon Prime, among others that make its content available to be streamed. In various aspects, streaming as used herein may also include the viewing or consumption of media that is downloaded to one or more client devices.

The streaming content from content provider server 110 may be provided through a content provider server API 130, which allows various types of content sources server 110 to communicate over the public network 150. The content provider server API 130 may be specific to the particular language, operating system, protocols, etc. of the content provider server 110 providing the streaming content. In a network environment 100 that includes multiple different types of content provider servers 110, there may likewise be a corresponding number of content provider server APIs 130.

The content provider server API 130 therefore facilitates direct or indirect access for each of the client devices 160 to the content hosted by the content provider servers 110. Additional information, such as metadata, about the accessed content can also be provided by the content provider server API 130 to the client device 160. As described below, the additional information (i.e. metadata) can be usable to provide details about the content being streamed to the client device 160. Finally, additional services associated with the accessed content such as chat services, ratings and profiles can be provided from the content provider servers 110 to the client device 160 via the content provider server API 130.

The content provider server API 130 can be accessed by a content delivery host server 140. The content delivery host server 140 may include a server that provides resources and files related to the media stream, including promotional images and service configurations with client devices 160. The content delivery host server 140 can also be called upon by the client devices 160 that request to stream or subscribe to specific content.

The content provider server API 130 may be accessed by a host server API 170 in order to obtain information about available streaming content for the client device 160. As described below, the additional information about the content may include metadata describing the available content (e.g., by author, title, genre). The information may also include a location where the content is stored (e.g., URL) so that the viewer device can proceed with retrieving the content from the content provider server 110. Furthermore, the host server API 170 may include instructions or graphic viewer interfaces for implementing functionalities (e.g., chat) that would allow viewers at different client devices 160 and the expert client device 190 to interact with each other. Such instructions may be used by the host server API 170 to provide certain functionalities to the client device 160.

The host server API 170 may be responsible for communicating with the different content provider servers 110 in order to provide that content to the client device 160. The host server API 170 may carry out instructions, for example, for identifying the format of the media content and formatting the media content to be playable on the client device 160. Such formatting may include identifying the metadata associated with each of the content then using various different types of conversion techniques so that data stored in one format at the content provider servers 110 may be rendered and displayed on the client devices 160, which may require a different format. As such, media content of different formats may be provided to and made compatible with client device 160 via the host server API 170.

The host server 140 further stores and retrieves data from a host database 180. The host database 180 also stores any expert annotations/comments created during or after consumption of streaming media at the client device 160. The database 180 also stores the metadata associated with the media stream being provided to the client devices 160. The host server 140 can generate metadata to relevant to the viewers' interactions with the hot server 140. In one example, the metadata can be used to link expert annotations and commentary to the streaming media.

The public network 150 facilitates communication of the steaming media from the content provider server 110 and the host server 140 with the plurality of client devices 160. The public network 150 can also include one or more private networks, such as, a local area network (LAN), a wide area network (WAN), or a network of public/private networks, such as the Internet. The Internet is a broad network of interconnected computers and servers allowing for the transmission and exchange of Internet Protocol (IP) data between viewer devices connected through a network service provider. Examples of network service providers include the public switched telephone network, a cable service provider, a provider of digital subscriber line (DSL) services, or a satellite service provider.

The client device 160 and the expert client device 190 may include a plurality of different types of computing devices. For example, the client device 160 and the expert client device 190 may be any number of different gaming consoles, mobile devices, laptops, and desktops. The client devices 160 and the expert client device 190 may also be configured to access data from other storage media, such as, but not limited to memory cards or disk drives as may be appropriate in the case of downloaded services. The client devices 160 and the expert client device 190 may include standard hardware computing components such as, but not limited to network and media interfaces, non-transitory computer-readable storage (memory), and processors for executing instructions that may be stored in memory. These client devices 160 may also run using a variety of different operating systems (e.g., iOS, Android), applications or computing languages (e.g., C++, JavaScript). An exemplary client device 160 or an exemplary expert client device 190 is described in detail herein with respect to FIG. 2.

Figure 2:
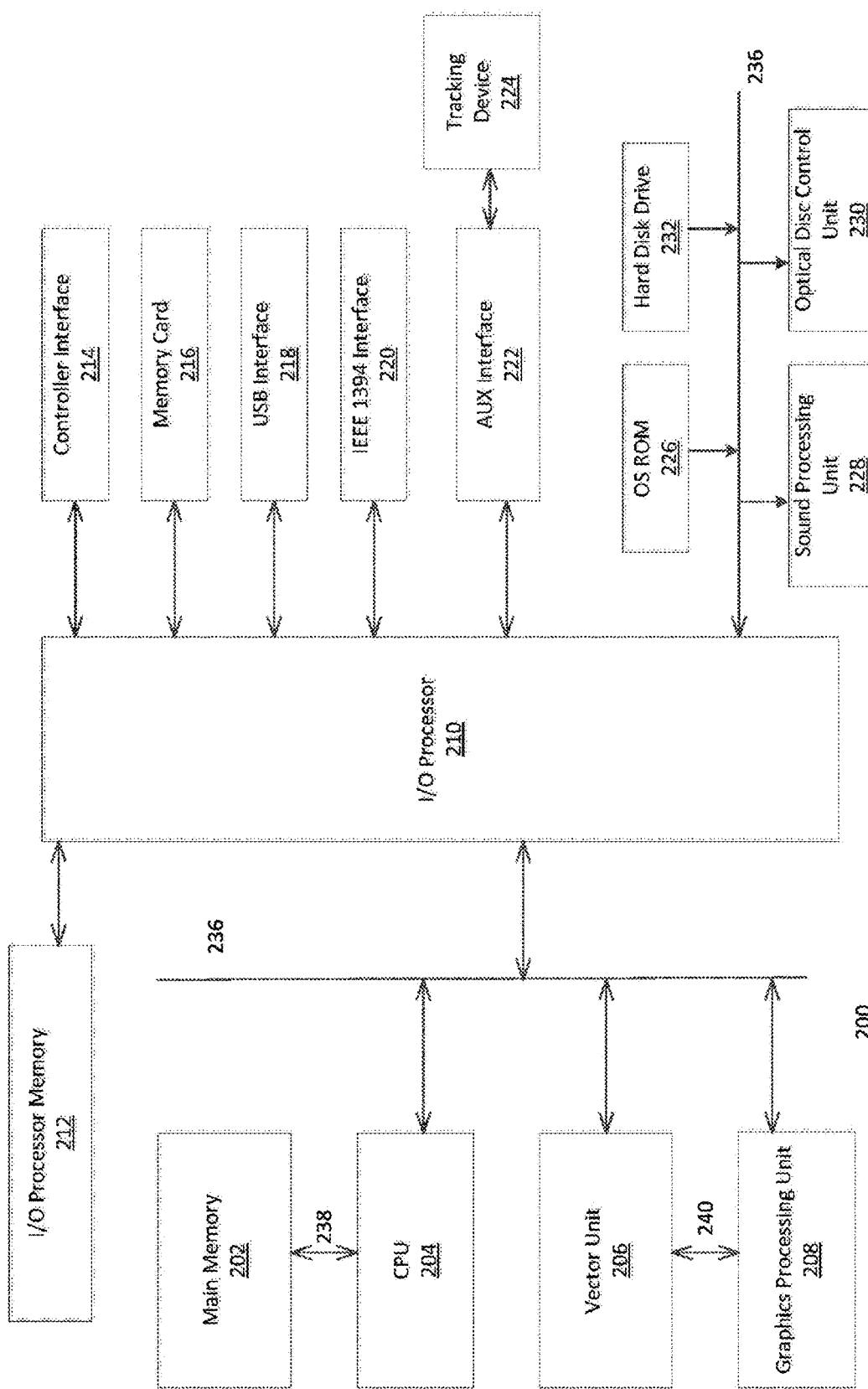
FIG. 2 is an exemplary viewer device that may be used in context of the system of FIG. 1.

FIG. 2 is an exemplary viewer device 200 that may be used in context of the system of FIG. 1 to view streaming media, among other functionalities. The client device 200 may correspond to client device 160 and/or the expert client device 190 of FIG. 1 and may be inclusive of desktop, laptop, tablet, mobile device, console gaming system, etc. The client device 200 is a device that the viewer can utilize to facilitate carrying out features of the present disclosure pertaining to the group-watching of streaming media and the incorporation of expert commentary. In particular, the client device 200 allows the viewer to view the streamed media at any location and time remotely.

The client device 200 may include various elements as illustrated in FIG. 2. It should be noted that the elements are exemplary and that other aspects may incorporate more or less than the elements illustrated. With reference to FIG. 2, the client device 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE interface 220, an auxiliary (AUX) interface 222 for connecting a tracking device 224, although other bus standards and interfaces may be utilized. The client device 200 further includes an operating system read-only memory (OS ROM) 226, a sound processing unit 228, an optical disc control unit 230, and a hard disc drive 232, which are connected via a bus 234 to the I/O processor 210. The client device 200 further includes at least one tracking device 224.

The tracking device 224 may be a camera, which includes eye-tracking capabilities. The camera may be integrated into or attached as a peripheral device to client device 200. According to various aspects, typical eye-tracking devices may use infrared non-collimated light reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer may be needed before using the eye tracker.

In other aspects, trackers that are more sensitive may use reflections from the front of the cornea and that back of the lens of the eye as features to track over time. In yet other aspects, even more sensitive trackers image features from inside the eye, including retinal blood vessels, and follow these features as the eye rotates. Most eye-tracking devices may use a sampling rate of at least 30 Hz, although 50/60 Hz is most common. Some tracking devises may run as high as 240 Hz, which is needed to capture detail of very rapid eye movement. The foregoing describes example eye-tracking technology that may be used in accordance with the present disclosure. In various aspects, any known eye gaze tracking technology that one skilled in the art would be capable of applying could be used.

A range camera may instead be used with the present disclosure to capture gestures made by the viewer and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This viewer device may also employ a variant of image-based three-dimensional reconstruction.

The tracking device 224 may include a microphone integrated into or attached as a peripheral device to client device 200 that captures voice data. The microphone may conduct acoustic source localization and/or ambient noise suppression. The microphones may be usable to receive verbal instructions from the viewer to schedule, retrieve, and display content on the client device 200.

Alternatively, tracking device 224 may be the controller of the viewer device 200. The controller may use a combination of built-in accelerometers and infrared detection to sense its position in 3D space when pointed at the LEDs in a sensor nearby, attached to, or integrated into the console of the entertainment system. This design allows viewers to control functionalities of the client device 200 with physical gestures as well as button-presses. The controller connects to the client device 200 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement. Further still, in various aspects, any technology suitable for measuring and/or capturing motion, facial expressions and/or any other physical or physiological state of a viewer may be used.

As noted above, the client device 200 may be an electronic gaming console. Alternatively, the client device 200 may be implemented as a general-purpose computer, a set-top box, or a hand-held gaming device. Further, similar viewer devices may contain more or less operating components.

The CPU 204, the vector unit 206, the graphics-processing unit 208, and the I/O processor 210 communicate via a system bus 236. Further, the CPU 204 communicates with the main memory 202 via a dedicated bus 238, while the vector unit 206 and the graphics-processing unit 208 may communicate through a dedicated bus 240. The CPU 204 executes programs stored in the OS ROM 226 and the main memory 202. The main memory 202 may contain pre-stored programs and programs transferred through the I/O Processor 210 from a CD-ROM, DVD-ROM, or other optical disc (not shown) using the optical disc control unit 230. The I/O processor 210 primarily controls data exchanges between the various devices of the viewer device 200 including the CPU 204, the vector unit 206, the graphics processing unit 208, and the controller interface 214.

The graphics-processing unit 208 executes graphics instructions received from the CPU 204 and the vector unit 206 to produce images for display on a display device (not shown). For example, the vector unit 206 may transform objects from three-dimensional coordinates to two-dimensional coordinates, and send the two-dimensional coordinates to the graphics-processing unit 208. Furthermore, the sound processing unit 230 executes instructions to produce sound signals that are outputted to an audio device such as speakers (not shown).

A viewer of the client device 200 provides instructions via the controller interface 214 to the CPU 204. For example, the viewer may instruct the CPU 204 to store certain information on the memory card 216 or instruct the viewer device 200 to perform some specified action. Example controllers associated with the controller interface 214 may include a touch-screen, keyboards, and game controllers.

Other devices may be connected to the client device 200 via the USB interface 218, the IEEE interface 220, and the AUX interface 222. Specifically, a tracking device 224, including a camera or a sensor may be connected to the client device 200 via the AUX interface 222, while a controller may be connected via the USB interface 218. In some aspects, a VR headset or related hardware equipment may be communicatively coupled to computing device 200 via one or more computing interfaces. Hardware and related software for implementing an augmented reality (AR) experience may similarly be coupled to computing device 200 via one or more computing interfaces.

Figure 3:
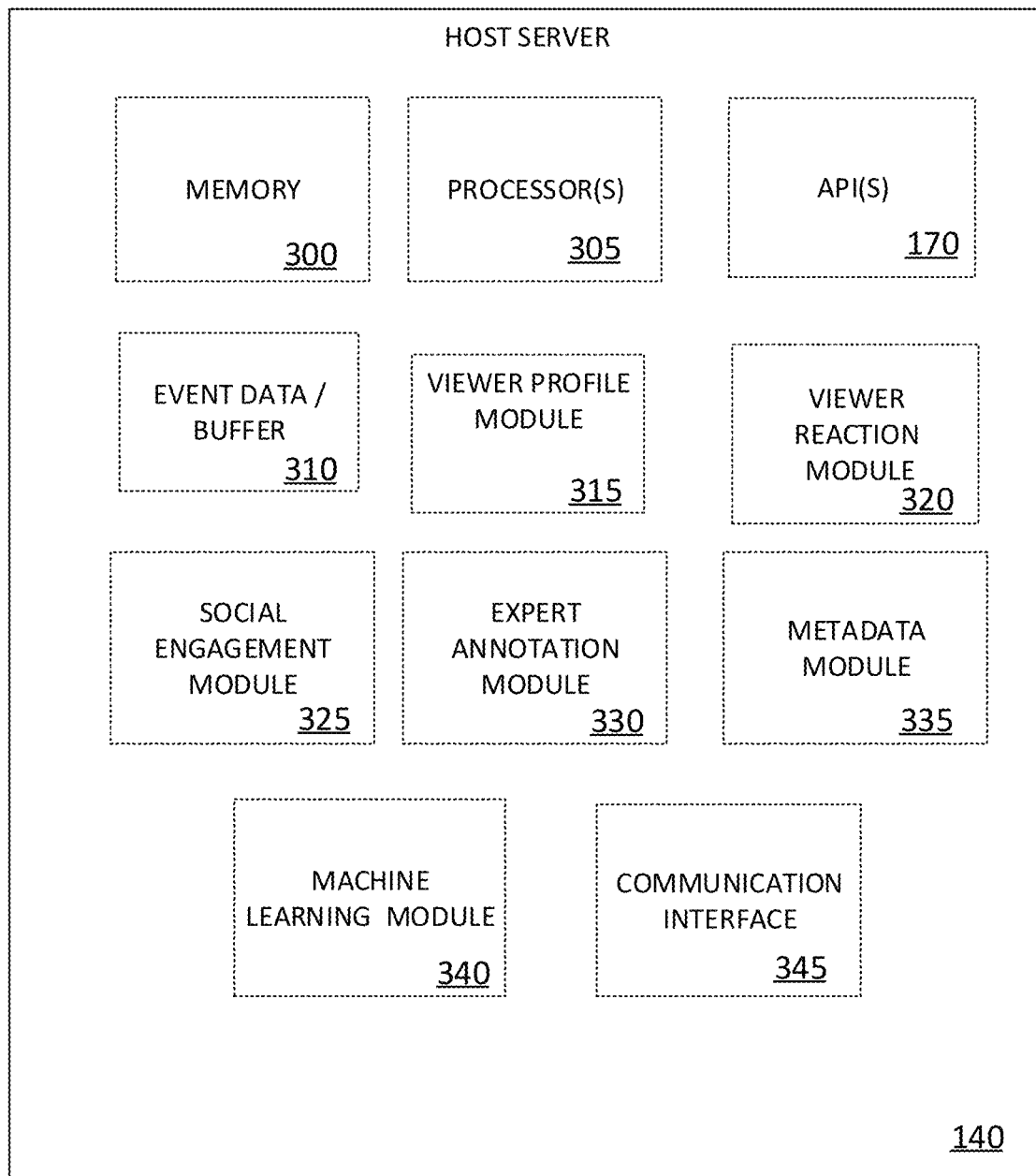
FIG. 3 is a block diagram of an exemplary host server that may be used in context of the system of FIG. 1.

FIG. 3 is a block diagram of an exemplary host server 140 that may be used in context of the system of FIG. 1. The host server 140 may include a plurality of different features that facilitates group-viewing and the incorporation of expert commentary and annotations in to the display of the streaming media. As illustrated in FIG. 3, the host server 140 may include memory 300, one or more processor 305, the host server application program interface (API) 140, a streaming media storage and buffer 310, a viewer profile module 315, a viewer reaction module 320, a social engagement module 325, an expert annotation module 330, a metadata module 335, a machine learning module 340, and a communication interfaces 345.

According to one aspect, the host application program interface (API) 170 allows a host to manage how data, including but not limited to the media stream, is distributed to remote viewers. Using the API 170, an administrator (e.g., developer, gaming platform provider, streaming media aggregator) can customize and modify how the host server operates with respect to what data is retrieved from the content provider server 110, how the media stream is presented to the client devices, and how expert annotations and/or commentary are obtained and compiled during viewing of the media stream.

The media storage and buffer 310 may be used to store the streaming media temporarily until it can be processed and distributed to viewers. In another aspect, the media storage and buffer may be used to store the expert comments and annotations temporarily.

The viewer profile module 315 is used to store information about each viewer. In one aspect, viewers may need to create their own profile and sign in to their respective profiles before being allowed to access/view the media content ("streamed media"). The stored viewer profiles would be used by the host server 140 to identify the types of modifications to the media stream or expert comments and annotations that can be carried out to better engage the viewer in the viewing experience.

The viewer profile module 315 may also store viewer preferences about the distribution of the media viewed on their respective client devices 160. For example, the viewer profile module 315 can customize preferred views, preferred additional information to be displayed, preferred audio, and even preferred advertisements. The viewer profile module 315 also stores privacy settings and preferences for the viewers. For example, the viewer preferences may include the identification, such as name, social media accounts, or other identifying information for a preferred expert or preferences for experts affiliated with a particular publication or university, among others.

The viewer profile module 315 can also store information about the client devices. This information may identify, for example, the format the media stream would need to be transmitted in order to be compatible with the client device. With all the information about the viewer stored in the viewer profile, the host server 140 would be able to identify the appropriate version of the media stream to be distributed.

The viewer reaction module 320 receives and processes viewer-generated content related to a viewer's reaction to the presented streaming media. The reactions may also include physical movements or facial expressions captured by the tracking device 224. During group-viewing of the media stream, the viewer reaction module 320 captures data from the viewer's respective client devices 160. In one aspect, the viewer reaction module 320 may identify a type of reaction made by the viewer and classify the same as a piqued curiosity or confusion, among others. In this aspect, the viewer reaction module may identify a viewer's reaction to the streaming media, such as a raised eyebrow, a confused expression, or interacting with another mobile device, as a reaction indicating further interest in the streamed media. In response, expert commentary or annotations may be displayed to the viewer along with the streaming media.

The social engagement module 325 facilitates and encourages further engagement with the media stream and social interactions among the viewers at the client devices 160 and the expert client device 190. In various aspects, the social engagement module 325 may facilitate social interactions between the groups of viewers. For example, the social engagement module 325 may generate a video chat among viewers of the media stream. In another aspect, the social engagement module 325 may facilitate communication between viewers using chat, email, video chat, or any other suitable communication modalities.

In one aspect, the expert annotation module 330 identifies and/or selects experts to provide commentary and annotations regarding a specific subject matter or a particular streaming media title. As such, the expert annotation module may identify one or more experts to comment upon the entire streaming media title or portions thereof. In conjunction with the machine learning module 340, the expert annotation module 330 may select experts using crowd-sourced data, machine learning (e.g. artificial intelligence ("AI") or an expert credential verification process.

By way of example, the expert annotation module 330 may select an expert based upon various criteria including but not limited to academic pedigrees, experience in a relevant industry, or social media followers/subscribers, among others. The expert annotation module 330 may further verify a potential expert's credentials or the content of their annotations through AI review and comparison with a wide-variety of trustworthy or factual sources.

In various aspects, the expert annotation module 330 may retain verification results for expert based, at least in part on previously provided comments and annotations. As such, the module may generate assign, and store a veracity score for each potential expert. The verification score may be retrieved, referenced, and revised to further verify & support, or reject an experts' past, present, and future comments and annotations. As such, the expert annotation module 330 may maintain regularly updated data and profiles for each expert providing comments.

In another aspect, the expert annotation module 330 receives annotations and commentary from one or more experts paired with the viewers. The experts may be randomly paired with the particular group of viewers to watch and provide commentary in real-time or near real-time with the group-watching event. Alternatively, the expert or experts may be preselected or identified by the host server and provided annotations or commentary regarding the streaming media in advance. The expert's comments and annotations are then stored in a database and presented in an expert annotation overlay 402 accompanying the streaming media. The viewers may select when the expert overlay 402 is displayed during the streaming of the media title. For example, the viewers may select to display the overlay throughout the entire presentation of the streaming media, or the viewer may toggle the expert overlay one or off. In other aspects, the host server 140 may automatically display the expert commentary and annotations in response to data about the viewer stored in the viewers profile or in response to viewer reactions during the display of the streaming media. Whether generated during the display of the streaming media or generated beforehand, the expert commentary and annotations, along with corresponding timestamps regarding the streaming media may be stored in a database. The expert annotation module 330 also creates the annotation overlay 402 from images, video, text or other inputs received from the experts' client devices 190. Additionally, the annotation overlay module may receive annotations and commentary identified with timestamps regarding the streaming media.

Figure 4A:
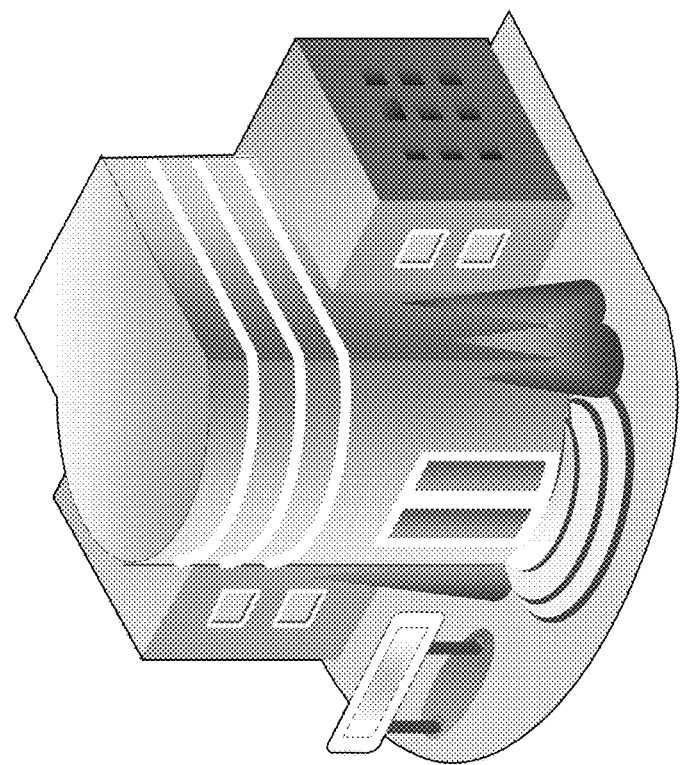
FIG. 4A is an exemplary expert annotation overlay created during the use of the system of FIG. 1.
Figure 4B:
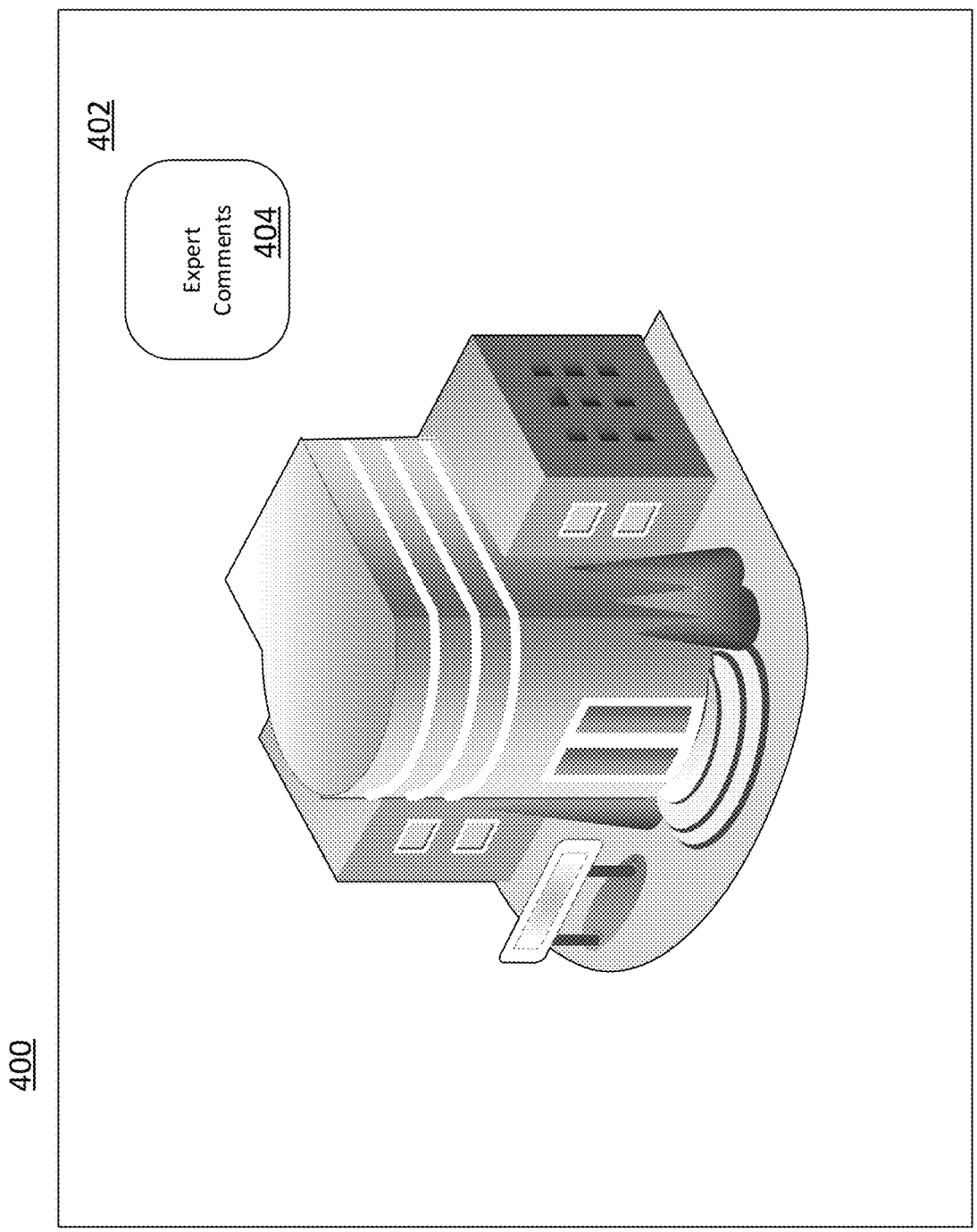
FIG. 4B is another exemplary expert annotation overlay created during the use of the system of FIG. 1.

In various aspects, these annotations 404 may be incorporated into an annotation overlay 402, various examples of the annotation overlay 402 are shown in FIGS. 4A and 4B. One example of the annotation overlay 402, as shown in FIG. 4A, illustrates that the expert annotations may be presented in the portion or region of the display 400 normally associated with the display of subtitles. Further, when the viewer desires to view the subtitles, the expert annotations may be displayed in another peripheral portion of the display 400.

Another example of the annotation overlay 402 is shown in FIG. 4B. In this example, the expert annotation module in combination with the machine learning module 340 may identify portions of the streaming media display 400 that are in the background and display the expert annotation in these areas. Other formats and arrangements for the display of the expert annotations and comments may be used.

In various other aspects, the overlay 402 may be formatted for display over the streamed media without obstructing the streamed media. In another aspect, the overlay 402 may be displayed alongside the streamed media; while in other aspects, the overlay 402 is not displayed to viewer's during the group-viewing yet may be presented during a pause in the streamed media or after the conclusion of the streamed media. The example annotation overlay 402 is illustrated in FIGS. 4A and 4B as a single frame for simplicity. The overlay 402 as stored by the host server 140 may be a composition or, even a distinct streaming media file composed of one or more annotations relevant to the streaming media that are displayed at the corresponding timestamps. In yet another aspect, the overlay 402 and annotations 404 are only displayed at the associated time point or they may be displayed in advance of the timestamp as preferred or pre-determined by the viewer. For example, each viewer may indicate in their profile how much advance warning they would prefer to receive for each annotation.

The social engagement module 325 facilitates and encourages further engagement with the media stream and social interactions among the viewers at the client devices 160. In various aspects, the social engagement module 325 may facilitate social interactions between the groups of viewers. For example, the social engagement module 325 may generate a video chat among viewers of the media stream. In one aspect, the members of the video chat may be limited to viewers invited to the video chat. In another aspect, the social engagement module 325 may facilitate communication between viewers using chat, email, video chat, or any other suitable communication modalities.

The metadata module 335 generates metadata for the media stream, the expert annotations, and the overlay 402 created during the group-viewing. Additionally, the generated metadata may be used to synchronize annotations and overlay with the media stream further. The metadata may also be used to recall previous instances of the annotations and overlay, and portions thereof. In another aspect, the metadata module 335 may identify or assign timestamps related to the streaming media and/or in response to the expert's comments and/or inputs.

The machine learning module 340 may be an internal or external artificial intelligence (AI) or other machine learning system trained using any suitable machine learning model, system, or dataset to predict or identify likely viewer preferences and likely actions while viewing the media stream, among others. The machine learning module 340 may also be used to predict viewer reactions and may adjust the tracking device 224 automatically. For example, the machine learning module 340 may determine when a viewer displays interest in a particular portion of the streaming media. Based on this determination, the machine learning module 340 may instruct a tracking device 224 of the viewer's client device 160 to zoom-out to capture a predicted whole body reaction. Alternatively, the machine learning module 335 may provide instructions to the tracking device 224 to zoom-in on a viewer's face. The machine learning module 335 may determine the best tracking device 224 settings to capture a likely reaction based upon previous viewer actions, historic viewer reactions from all viewers of the media stream or combinations thereof. As such, the machine leaning module 335 may predict when the viewer desires to view the annotation overlay 402, if not already selected for display.

The communication interface 345 facilitates communication between the various features of the system of FIG. 1. For example, this would facilitate transmission of information from the content provider server 110 to the host server 140 and from the host server to the client devices 160.

Figure 5:
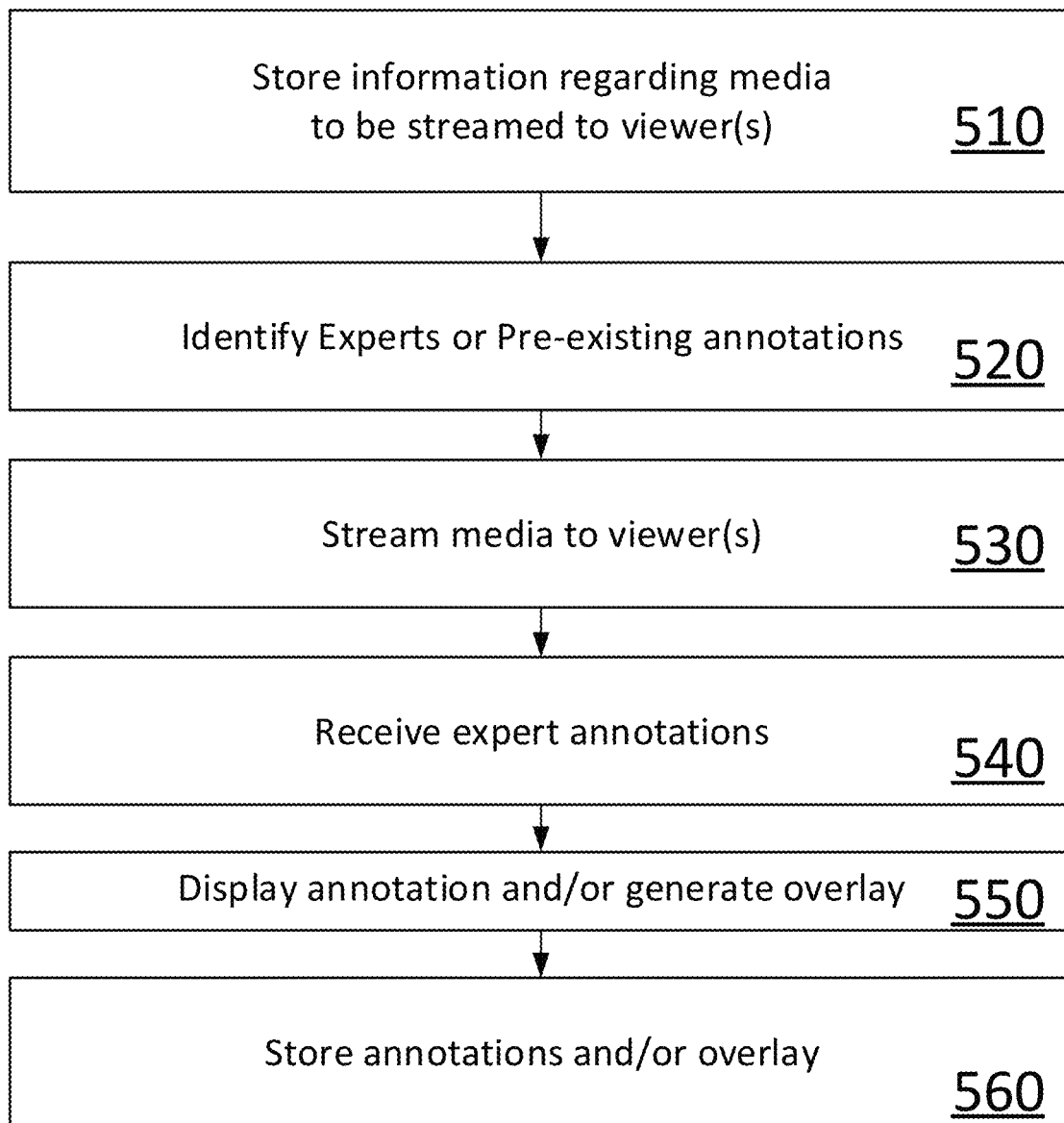
FIG. 5 is a flowchart illustrating a method of generating an expert annotation overlay using the system of FIG. 1.

FIG. 5 is a flowchart illustrating an exemplary method 500 for generating an expert annotation overlay 402 and displaying the overlay during group-watching of a media stream or streaming media. The method 500 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to perform or aid in performing the method. The steps identified in FIG. 5 (and the order thereof) are exemplary and may include various alternatives, equivalents, or derivations thereof including but not limited to the order of execution of the same.

In method 500, information may be stored in memory regarding the media content that may be streamed to the client devices 160. Expert annotations may be input during play of the streamed media content. The annotations may be composited into an annotation overlay 402 that may be subsequently shared on various social media platforms. Additionally, one or more timestamps may be associated with the captured content and the streaming media, such that the annotation content and streaming media may be synchronized for later streaming and display. In this aspect, the streaming media and annotation overlay 402 may be viewed again by the viewers. Alternatively, an acquaintance of the group-viewing the streaming media may view the streaming media at a later time and view the previously generated annotation overlay 402 or they may provide their own annotations and reactions to augment, revise, or modify an existing annotation overlay or to generate a new annotation overlay.

In step 510, information may be stored in memory regarding a content provider and a media stream. A host may establish a channel or interface for distributing the media stream from the content provider. The host may require authentication information from viewers (e.g., viewer name, password) that allows an account to be established in association with the content distribution interface. In addition, various other devices in the network may subscribe to receive content distributed through the interface. Information regarding the host, the content provider, data regarding the streamed media, and the viewers of the group-viewing event may be maintained in memory. Where certain content providers require a specific subscription (e.g., "premium" cable content), the subscriber device may be required to have a subscription associated with the content provider in order to access content through the channel.

In step 520, one or more experts to provide annotations and commentary are identified. In one aspect, the experts are identified and paired with one or more viewers who may be group-watching the streaming media. In one aspect, the experts are paired to provide commentary in real time with the group-watching event. In another aspect, the expert may be identified to pre-record or pre-submit commentary regarding the streaming media for a later scheduled group-watching event. Alternatively, existing expert annotations and the associated overlays may be identified and retrieved for display during a group-watching event. In various aspects, the identification of preferred experts may be informed by data in one or more viewer's profiles.

In step 530, the media content (e.g., a specified episode of a television program) may be streamed to the client devices 160. As discussed herein, the media content may include any type of pre-recorded or live media content available to be streamed over a communication network. Such media content may originate from a content provider server 110, formatted by content provider server API 130 and they are then provided to the client devices through an interface generate by the host server API 170. In another aspect, the streaming media may be provided to the client device directly from the content provider server or another source, while the host server API 170 communicates with the content provider server or other source at the backend to gather data regarding the streaming media and synchronize pre-existing expert content.

In step 540, annotations or other content generated by the expert may be received, otherwise captured, or retrieved during display of the streaming media. In various aspects, the expert annotations may include audio or video commentary, text, graphics, and other types of content provided by the expert regarding the streaming media.

In step 550, the annotations are displayed to the viewers in real time and/or are incorporated into an annotation overlay 402 for display to the viewers. In one aspect, the expert annotations 404 or overlay 402 may be displayed automatically throughout the display of the streaming media. In another aspect, the viewer may selectively toggle the display of the annotations on or off during the display of the streaming media. In yet another aspect, the display of the expert annotations may occur in response to a viewer reaction captured by the tracking device 224 of the viewer's client device 160. The viewer reaction may be interpreted by the machine learning module 340 of the host server 140 a one of curiosity or confusion and may therefore automatically display an annotation regarding the subject matter of the streaming media that was recently displayed or is currently being displayed.

Lastly, in step 560, the compiled annotations and/or the overlay 402 may be stored and associated with the streaming media for future display. In future displays of the streaming media, one or more additional expert annotations may be incorporated into an existing overlay 400, such that additional information may be provided or previous annotations may be corrected.

The foregoing detailed description of the technology herein has been presented for purposes of illustration and description. It is not intended to be exhaustive or to limit the technology to the precise form disclosed. Many modifications and variations are possible in light of the above teaching. The described aspects were chosen in order to best explain the principles of the technology and its practical application to thereby enable others skilled in the art to best utilize the technology in various aspects and with various modifications as are suited to the particular use contemplated. It is intended that the scope of the technology be defined by the claim.

What is claimed is:

1. A method for creating and displaying annotations to a viewer of streaming media, the method comprising:
storing data in memory regarding the streaming media;
identifying an expert to provide the annotations;
displaying the streaming media to a viewer device of the viewer;
receiving the annotations from the identified expert;
tracking facial movements of the viewer in response to the display of the streaming media at the viewer device; and
automatically displaying the annotations with the streaming media based on the tracked facial movements of the viewer.

2. The method of claim 1, wherein the received annotations include a previously stored annotation, and further comprising:
identifying the previously stored annotation; and
retrieving the previously stored annotation, wherein automatically displaying the annotations includes displaying the previously stored annotation.

3. The method of claim 1, further comprising:
generating an annotation overlay comprising the received annotations;
synchronizing the annotation overlay with the streaming media, wherein automatically displaying the annotations includes displaying the annotation overlay synchronized with the streaming media; and
storing the annotation overlay.

4. The method of claim 1, wherein the expert is identified for one or more portions of the streaming media using at least one of crowd-sourced data, machine learning, and expert credential verification.

5. The method of claim 1, wherein the annotations are displayed in a peripheral portion of the streaming media.

6. The method of claim 5, wherein the annotations are displayed in a region of the streaming media corresponding to a subtitle.

7. The method of claim 1, wherein the annotations are displayed in a background of the streaming media.

8. The method of claim 1, further comprising storing the annotation data in a database.

9. A system for creating and displaying annotations to a viewer of streaming media, the system comprising:
a database that stores data regarding the streaming media and one or more annotations and overlays;
a content provider server that provides the streaming media; and
a host server that:
identifies an expert to provide the annotations;
displays the streaming media to a viewer device of the viewer;
receives the annotations from the identified expert;
tracks facial movements of the viewer in response to the display of the streaming media at the viewer device; and
automatically displays the annotations with the streaming media based on the tracked facial movements of the viewer.

10. The system of claim 9, wherein the received annotations include a previously stored annotation, and wherein the host server further:
identifies the previously stored annotation; and
retrieves the previously stored annotation, wherein automatically displaying the annotations includes displaying the previously stored annotation.

11. The system of claim 9, wherein the host server further:
generates an annotation overlay comprising the received annotations;
synchronizes the annotation overlay with the streaming media, wherein the host server automatically displays the annotations by displaying the annotation overlay synchronized with the streaming media; and stores the annotation overlay.

12. The system of claim 9, wherein the expert is identified for one or more portions of the streaming media using at least one of crowd-sourced data, machine learning, and expert credential verification.

13. The system of claim 9, wherein the annotations are displayed in a peripheral portion of the streaming media.

14. The system of claim 13, wherein the annotations are displayed in a region of the streaming media corresponding to a subtitle.

15. The system of claim 9, wherein the annotations are displayed in a background of the streaming media.

16. A non-transitory computer-readable storage medium having embodied thereon a program, the program being executable by a processor to perform a method for creating and displaying annotations to a viewer of streaming media, the method comprising:

storing data in memory regarding the streaming media;

identifying an expert to provide the annotations;

displaying the streaming media to a viewer device of a viewer;

receiving the annotations from the identified expert;

tracking facial movements of the viewer in response to the display of the streaming media; and automatically displaying the annotations in association with the streaming media based on the tracked facial movements of the viewer.

17. The non-transitory computer-readable storage medium of claim 16, wherein the received annotations include a previously stored annotation, and further comprising instructions executable for:

identifying the previously stored annotation; and retrieving the previously stored annotation, wherein automatically displaying the annotations includes displaying the previously stored annotation.

18. The non-transitory computer-readable storage medium of claim 16, further comprising instructions executable for:

generating an annotation overlay comprising the received annotations;

synchronizing the annotation overlay with the streaming media, wherein automatically displaying the annotations includes displaying the annotation overlay synchronized with the streaming media; and storing the annotation overlay.

19. The non-transitory computer-readable storage medium of claim 16, wherein the expert is identified for one or more portions of the streaming media using at least one of crowd-sourced data, machine learning, and expert credential verification.

20. The non-transitory computer-readable storage medium of claim 16, wherein the annotations are displayed in a peripheral portion of the streaming media.

21. The non-transitory computer-readable storage medium of claim 20, wherein the annotations are displayed in a region of the streaming media corresponding to a subtitle.

22. The non-transitory computer-readable storage medium of claim 16, wherein the annotations are displayed in a background of the streaming media.

* * * * *